US007563066B2

(12) United States Patent
Jones et al.

(10) Patent No.: US 7,563,066 B2

(45) Date of Patent: Jul. 21, 2009

(54) REFUSE BODY WITH EJECTION WALL

(75) Inventors: Robert D. Jones, Guttenburg, IA (US); Virgil Collins, Guttenburg, IA (US); Marlin L. Johnson, Guttenberg, IA (US); Randy J. Heller, Garnavillo, IA (US); Jeffrey E. Errthum, Holy Cross, IA (US); Jared L. Rowland, Dyersville, IA (US); Kenneth D. Goedken, Dubuque, IA (US)

(73) Assignee: Kann Manufacturing Corporation, Guttenberg, IA (US)

( * ) Notice: Subject to any disclaimer, the term of this patent is extended or adjusted under 35 U.S.C. 154(b) by 566 days.

(21) Appl. No.: 10/982,507

(22) Filed: Nov. 5, 2004

(65) Prior Publication Data

US 2005/0063808 A1 Mar. 24, 2005

Related U.S. Application Data

(63) Continuation-in-part of application No. 10/410,985, filed on Apr. 10, 2003, now abandoned.

(60) Provisional application No. 60/380,988, filed on May 15, 2002.

(51) Int. Cl.
*B60P 1/00* (2006.01)

(52) U.S. Cl. .................................................. 414/525.2

(58) Field of Classification Search .............. 414/525.1, 414/525.2, 407–409, 525.4
See application file for complete search history.

(56) References Cited

U.S. PATENT DOCUMENTS 3,584,755 A * 6/1971 Smith ......................... 414/517
3,647,098 A 3/1972 Smith
3,944,098 A * 3/1976 Foote ......................... 414/502

(Continued)

FOREIGN PATENT DOCUMENTS

NZ 234238 A 4/1992

(Continued)

*Primary Examiner*—Saúl J Rodríguez
*Assistant Examiner*—Joshua I Rudawitz
(74) *Attorney, Agent, or Firm*—Wenzel & Harms, P.C.; Allan L. Harms

(57) ABSTRACT

An improved front loading or side loading refuse collection body includes an ejector panel which is moveable from a position immediately adjacent the front end wall of the storage compartment of the refuse collection body to a second position at the open rear end of the storage compartment. A compaction blade in a compaction chamber adjacent the front end of the storage compartment is independently driven by a second hydraulic ram. The ejector panel has an opening which is in registry with the opening in the front wall of the storage compartment through which refuse is pushed by the compaction blade. A tray member may be fixed to a side of the ejector panel to catch refuse which falls back through the opening in the ejector panel when it is moved away from the front end of the storage compartment. A multiple compartment body may include two compaction chambers each adjacent one of two storage compartments. Each storage compartment has an ejection panel which is separately operable from the compaction blade of the associated compaction chamber and will sweep commodity from the storage compartment while the compaction blade remains at rest. Each ejection panel includes an aperture which is in registry with the compaction blade of associated compaction chamber.

31 Claims, 7 Drawing Sheets

U.S. PATENT DOCUMENTS 4,260,317 A * 4/1981 Martin et al. ............... 414/517
4,475,862 A * 10/1984 Paulsson et al. ............. 414/513
4,948,323 A * 8/1990 Gasparini ................... 414/408
4,950,122 A * 8/1990 Landsdorff ................. 414/512
5,484,246 A * 1/1996 Horning et al. ............. 414/409
5,560,713 A 10/1996 Christenson
5,599,071 A 2/1997 Kann et al. ................... 298/23
5,681,140 A * 10/1997 Christenson ............. 414/525.6
5,716,103 A 2/1998 Kann et al. ................... 298/25
5,769,501 A 6/1998 Kann et al. ................... 298/23
5,813,818 A * 9/1998 McNeilus et al. ........... 414/407
6,146,078 A * 11/2000 Hamill et al. ............... 414/511
6,146,079 A * 11/2000 Ghibaudo ................... 414/512
6,224,318 B1 5/2001 McNeilus et al.
6,953,316 B2 * 10/2005 Neufeldt et al. .......... 414/525.6
7,070,382 B2 * 7/2006 Pruteanu et al. .......... 414/525.2
2003/0077156 A1 * 4/2003 Bingman .................... 414/409
2003/0215315 A1 * 11/2003 Jones et al. ................. 414/517
2005/0135910 A1 * 6/2005 Pruteanu et al. ............. 414/517

FOREIGN PATENT DOCUMENTS

WO WO 91/00231 1/1991

* cited by examiner

REFUSE BODY WITH EJECTION WALL

CROSS-REFERENCE TO RELATED APPLICATIONS

This application is a continuation-in-part of Ser. No. 10/410,985 filed Apr. 10, 2003 now abandoned entitled "IMPROVED FRONT-LOADING REFUSE BODY WITH EJECTION WALL" which claimed priority from provisional patent application entitled "A GUIDED MOVEABLE PUSH OUT WALL OR EJECT PANEL WITH AN OPENING OR APERTURE TO COMPACT THROUGH FOR A REFUSE COLLECTION VEHICLE", Ser. No. 60/380,988 filed May 15, 2002. The disclosures of copending nonprovisional application Ser. No. 10/410,985 and provisional patent application Ser. No. 60/380,988 are hereby incorporated in their entireties.

BACKGROUND OF THE INVENTION

The present invention pertains to refuse collection vehicles and particularly to side loading compaction bodies for refuse and recyclables collection vehicles.

Refuse and recyclables collection vehicles include those with gravity-dumping bodies and those with rear ejection bodies. All refuse collection vehicles have loading means which may be manual or machine assisted, including rear end loading, side loading or front end loading collectors. In the case of side or front loading compaction bodies, refuse or recyclables are loaded into a receiving hopper which serves as a compaction chamber. A compaction blade then forces the refuse from the compaction chamber into a much larger storage compartment of the collection body. When the storage body is fully packed with compacted refuse, the vehicle must move to a landfill or transfer station to empty the storage compartment of the collection body.

A refuse collection vehicle equipped with a gravity-dumping body must open the tailgate of the body and raise the front of the collection body to an angle of forty to fifty degrees with one or more multistage telescoping hydraulic rams. Then the refuse can slide from the storage compartment of the gravity-dumping body by gravity. There are disadvantages with this type of body, namely, raising the collection body raises the center of gravity of the vehicle, making it less stable, and this instability is pronounced when the vehicle is being unloaded on soft ground such as at a landfill. On the other hand, when the vehicle is to be emptied within an enclosed transfer station, ceiling height may restrict the operation of the gravity-dumped collection body.

Current refuse collection bodies with a powered rear ejection system use a multistage telescoping hydraulic ram to compact the refuse into the storage compartment, using only one or two stages of the extension of the hydraulic ram. When the storage compartment is to be emptied, the tailgate is opened and the compaction blade is used to push the refuse from the open rear end of the body. When the compaction blade is so used, the hydraulic ram must be more fully extended, using more of its multiple stages. Repetitive extensions and retractions of the hydraulic ram to compact the refuse into the storage compartment causes uneven wear within the hydraulic ram due to repeated use of only the first or second stages of the multistage telescoping ram, thereby causing more rapid wear on the ram components during refuse collection. In addition, the compaction blade which compacts the refuse into the storage compartment must be of sufficient size to cause the refuse within the much larger storage compartment to be ejected.

BRIEF SUMMARY OF THE INVENTION

The present invention provides solutions to the problems identified by providing an improved front loading or side loading, rear ejection commodity collection body. Throughout this disclosure the terms "commodity" or "refuse" shall mean trash, garbage, refuse, commingled recyclables, sorted recyclables, and other discarded materials. An elongate storage compartment is joined to a compaction chamber into which loose commodity is first loaded and then compacted by forcing the commodity through an opening in the front end wall of the storage compartment and also through an opening in an ejection panel assembly located within the storage compartment immediately adjacent the front end wall of the storage compartment. The collection body is provided with a tailgate at its rear end which is opened when compacted commodity in the storage compartment is to be emptied. The ejection panel assembly rests immediately adjacent the front end wall of the storage compartment until unloading is desired, whereupon it may be moved through the storage compartment by action of a hydraulic ram which may be mounted upon the ejection panel assembly and to push against a reinforcing bar mounted across the front end wall. The ejection panel assembly includes a vertical panel which has an aperture through it which aligns with the opening in the front end wall when the ejection panel assembly is in its rest state. The ejection panel assembly also includes a pair of legs which extend perpendicularly from the bottom of the vertical panel and ride along a rail mounted on the floor of the storage compartment. The legs extend forward of the panel while a housing for the hydraulic ram extends rearward of the panel at a perpendicular from the approximate center of the panel. The hydraulic ram is a multistage telescoping hydraulic cylinder which forces the panel through the storage compartment by pushing it away from the front end wall, thereby ejecting the compacted commodity as the ejection panel assembly traverses the storage compartment. The ejection panel assembly completes its rearward movement when the panel is aligned with the open rear end of the storage compartment. The ejection panel assembly is then returned to its rest position immediately adjacent the front wall of the storage compartment and commodity can again be forced through the openings in the front end wall and in the ejection panel into the storage compartment.

This structure provides an improved commodity collection body which avoids the need to use a large compaction blade driven by a multistage ram to expel commodity from the storage compartment. The compaction blade may be driven by a single or two-stage hydraulic ram which is frequently cycled while the ejection panel may be driven by a multistage telescoping ram which is only operated when commodity is to be expelled from the collection body. Due to substantial compaction of commodity by the compaction blade as it pushes commodity past the ejection panel into the storage compartment, the stored commodity becomes a rigid mass and little will fall back through the aperture of the ejection panel when the ejection panel is activated to push the compacted commodity out the open rear end when the tailgate is opened. A tray member carried on the front side of the ejection panel will collect loose commodity which falls back through the aperture when the ejection panel is moved toward the rear end of the storage compartment.

It is therefore an object of the invention to provide an improved front loading or side loading commodity collection body which can be emptied without use of its compaction blade.

It is further an object of the invention to provide a front loading or side loading compacting commodity collection body which limits wear on the hydraulic cylinder which drives the compaction blade.

It is another object of the invention to provide a collection body which can compact refuse therein and allow exit of the refuse without elevating an end of the collection body.

It is yet another object of the invention to provide a compacting commodity collection body which permits use of a single stage hydraulic ram to operate the compaction blade of the collection body.

It is yet a further object of the invention to provide a compacting commodity collection body which may utilize a reduced size compaction blade for thrusting of commodity into the storage compartment of the collection body.

It is still another object of the invention to provide a compacting commodity collection body which provides for capture of commodity which falls through the ejection panel opening when the ejection panel is moved toward the open rear end of the storage compartment.

These and other objects will be understood from examination of the detailed description, claims, and drawings which are part of this disclosure.

BRIEF DESCRIPTION OF THE SEVERAL VIEWS OF THE DRAWING(S)

DETAILED DESCRIPTION OF THE INVENTION

Figure 1:
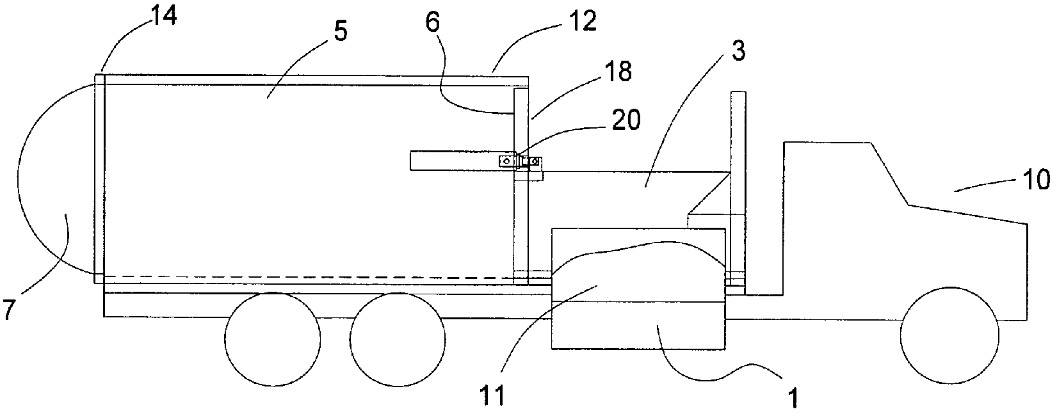
FIG. 1 is a front elevation of a refuse collection truck having the refuse collection body of the present invention, with the front walls of the refuse collection body omitted.

FIGS. 1-6 each provide a front elevational view of a refuse collection truck 10 equipped with the improved refuse collection body 12 of the present invention. The front walls of storage body 5 and compaction chamber 3 have been cut away from FIGS. 1-6. FIGS. 1-6 show various stages of operation of collection body 12. In FIG. 1, refuse collection truck 10 is depicted in condition to receive and store material with tailgate 7 in its closed and locked position over the open rear end 14 of storage compartment 5. Loader trough 1 is shown in its lowered collection position with loose trash 11 contained therein. Compaction chamber 3 is located forward of the front end wall 18 of storage compartment 5. Ejection panel assembly 6 is positioned adjacent front end wall 18 in its position for refuse to be forced into storage compartment 5 from compaction chamber 3. Hydraulic ram 20 is in its fully retracted position.

Figure 2:
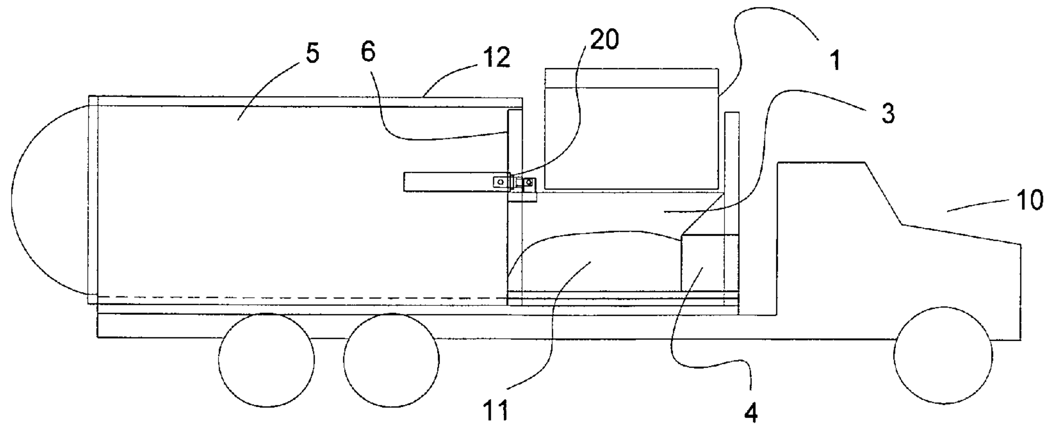
FIG. 2 is a front elevation of the refuse collection truck of FIG. 1 with the loading trough of the collection body in its elevated dumping position.

FIG. 2 illustrates refuse collection truck 10 with loader trough 1 in its elevated position. In this position, loader trough 1 is substantially inverted to cause any material therein to fall into compaction chamber 3. When loose trash 11 has dropped into collection chamber 3, compaction blade 4 rests in its retracted position forward of trash 11 ready to compact trash 11 and thrust it into storage compartment 5. Ejection panel assembly 6 remains in its retracted position.

Figure 3:
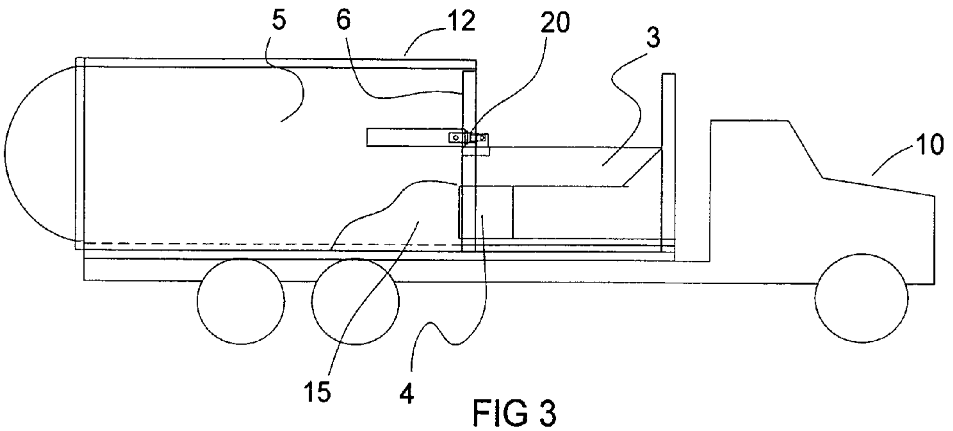
FIG. 3 is a front elevation of the refuse collection truck of FIG. 1 with the loading trough omitted and with the compaction blade in its extended position.

In FIG. 3, loader trough 1 has been omitted. The compaction blade 4 is shown in its extended position having forced compacted refuse 15 into storage compartment 5. Ejection panel assembly 6 remains in its retracted position with hydraulic ram 20 fully retracted.

Figure 4:
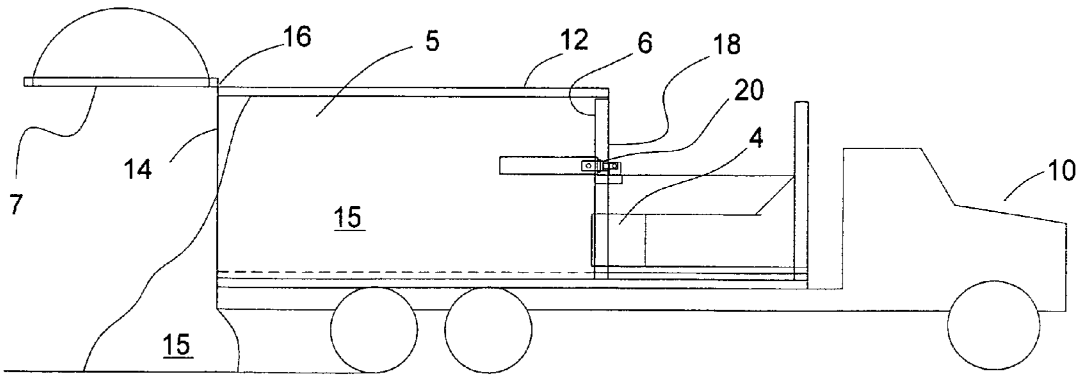
FIG. 4 is a front elevation of the refuse collection truck of FIG. 1 with the loading trough omitted and with the tailgate open.

FIG. 4 illustrates refuse collection truck 10 in position to expel compacted refuse 15 from storage compartment 5 of refuse collection body 12. Tailgate 7 has been unlocked and moved to its open position, rotated to an elevated position about hinges (not shown) on the top 16 of rear end 14 of storage compartment 5. Part of refuse 15 will fall from storage compartment 5 and from within tailgate 7 when tailgate 7 is opened with the remainder of compacted refuse 15 remaining within storage compartment 5. Ejection panel assembly 6 remains in its retracted position forward of compacted refuse 15. Compaction blade 4 is shown in its extended position extending partially through front end wall 18 and through ejection panel assembly 6. Hydraulic ram 20 remains fully retracted.

Figure 5:
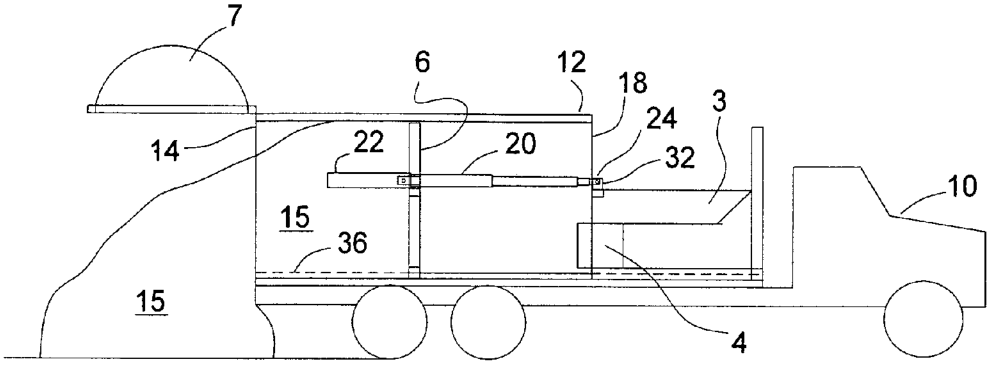
FIG. 5 is a front elevation of the refuse collection truck of FIG. 4 with the ejection panel assembly partly extended.

In FIG. 5, it can be seen that ejection panel assembly 6 has been moved along storage compartment 5 from front end wall 18 thereof toward rear end 14 thereby forcing refuse 15 to exit rear end 14 of storage compartment 5. Ejection panel assembly 6 has been moved toward rear end 14 by use of multistage telescoping hydraulic ram 20 which has extended partly from housing 22. Hydraulic ram 20 pushes against bar 32 of front end wall 18 upon which first end 24 of hydraulic ram 20 is mounted securely. Compaction blade 4 remains in its extended position partly extending through front end wall 18. Ejection panel assembly 6 is guided by rail 36.

Figure 6:
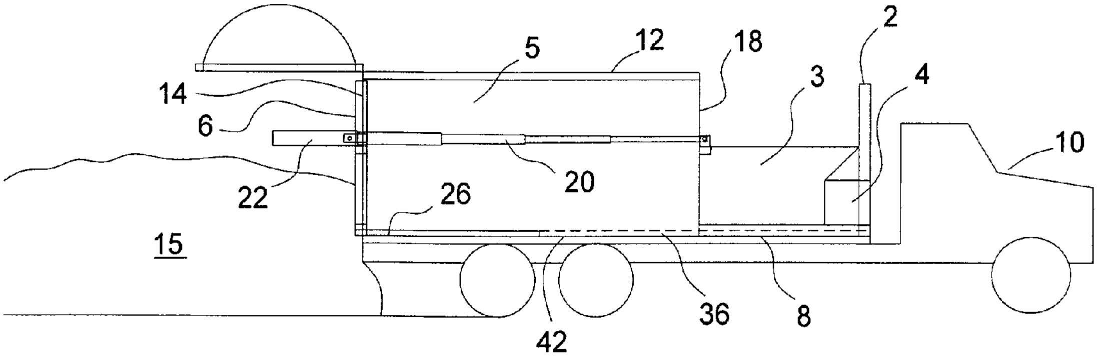
FIG. 6 is a front elevation of the refuse collection truck of FIG. 4 with the ejection panel assembly fully extended.

FIG. 6 depicts the refuse collection body 12 with ejection panel assembly 6 thereof moved substantially into alignment with rear end 14 of storage compartment 5, such that housing 22 for hydraulic ram 20 extends from the opening of rear end 14 of storage compartment 5. Hydraulic ram 20 may be a multistage telescoping hydraulic cylinder and in FIG. 6 is shown fully telescopically extended to cause ejection panel to expel all refuse 15 from storage compartment 5. Compaction blade 4 has been retracted to its forward position within compaction chamber 3, there no longer being a need to block refuse from moving into compaction chamber 3.

In FIG. 6, it can be seen that ejection panel assembly 6 is mounted to legs 26 which may slide along floor 42 of storage compartment 5 and along subfloor 8 of compaction chamber 3, guided by and engaged with rail 36 which extends longitudinally from rear end 14 of storage compartment 5 to bulkhead 2. Bulkhead 2 serves as a front wall of compaction chamber 3.

Figure 7:
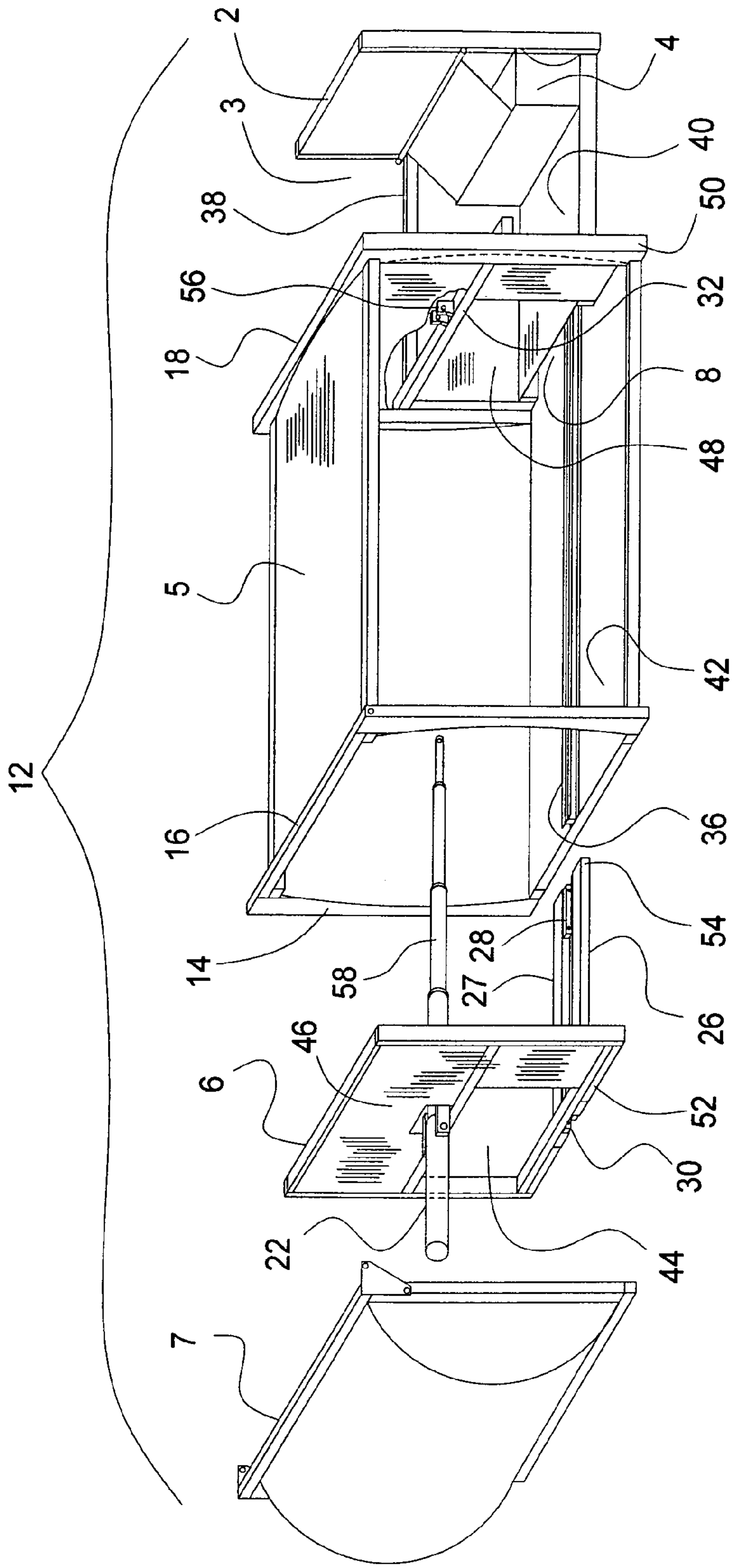
FIG. 7 is a front perspective partly exploded view of the refuse collection body 6 shown with the front walls cut away and loader trough omitted.

Referring now additionally to FIG. 7, compaction body 12 is illustrated in a partly exploded perspective view with parts omitted, namely, the loader trough and front walls of the storage compartment 5 and compaction chamber 3 have been removed for clarity of illustration.

Compaction body 12 comprises an elongate storage compartment 5 fixed at its front end wall 18 to compaction chamber 3. Compaction chamber 3 extends from rear end 18 and terminates at bulkhead 2 and is provided with opposing sidewalls of which sidewall 38 is seen in FIG. 7. It can be seen that compaction chamber 3 is offset horizontally from the longitudinal axis of storage compartment 5 to provide space for the loader trough (not shown in FIG. 7) to be operationally mounted beside compaction chamber 3. Tailgate 7 is hingedly attached at top 16 of rear 14 of storage compartment 5.

Compaction chamber 3 includes compaction blade 4 which rests alongside bulkhead 2 in its retracted position and is selectively extendable toward storage compartment 5 by sliding along floor platform 40 of compaction chamber 3. When compaction blade 4 is fully extended, it enters opening 48 in front end wall 18 of storage compartment 5, thereby thrusting any loose trash into storage compartment 5, compacting it as it is moved into storage compartment 5. Front end wall 18 is reinforced by bar 32 which, in the preferred embodiment, extends horizontally across front end 18 and is fixed securely to front end frame 50 of storage body compartment 5. Bar 32 is positioned such that it overlies and frames the top of opening 48 in frontend wall 18. Bar 32 serves as an anchor for telescoping hydraulic ram 20, rod 58 of which is mounted to rod mount 56. Hydraulic ram 20 extends from housing 22 when compacted refuse 15 is to be ejected from rear 14. Bar 32 is preferably a thick walled rectangular steel tube which can absorb high compaction forces of the refuse being forced into storage compartment 5 by compactor blade 4 and also to absorb high stress when multi-stage telescoping hydraulic ram 20 (See FIG. 5) is extended to push compacted refuse 15 from rear 14 of storage compartment 5.

Rail 36 extends from rear 14 of storage compartment 5 centrally along floor 42 of storage compartment 5 and into compaction chamber 3. Compaction chamber 3 is provided with raised floor platform 40 overlying its subfloor 8 which is coplanar with floor 42 of storage compartment 5. Rail 36 extends linearly into compaction chamber 3 along subfloor 8 below raised floor platform 40. Rail 36 is securely fastened to floor 42 and to subfloor 8 and may be an I-beam.

Ejection panel assembly 6 comprises a vertically oriented panel 46 with legs 26, 27 rigidly fixed to panel 46 at generally the midpoint of lower end 52 thereof. Rail 36 provides guide means for legs 26, 27 of ejection panel assembly 6. Paired legs 26, 27 extend perpendicularly from panel 46 in a direction toward front end wall 18 of storage compartment 5. Legs 26, 27 are parallel and are spaced apart a small distance. Legs 26, 27 include first and second pairs of wear pads 28, 30 respectively. Paired wear pads 28, 30 are mounted to legs 26, 27 in spaced apart opposition and slidingly bear on the side channels of rail 36. These paired wear pads 28, 30 are preferably constructed of "NIHARD" steel. Nylon wear pads or rollers may also be used for assisting the legs 26, 27 in following the rail 36. One pair of wear pads 28 is preferably located adjacent the distal end 54 of legs 26, 27 and the other pair of wear pads 30 is preferably located on legs 26, 27 at their attachment to panel 46. Paired wear pads 28, 30 may be replaceable as needed due to wear.

Ejection panel assembly 6 also comprises a housing 22 which may be cylindrical and houses multi-stage telescoping hydraulic ram 20. Rod 58 of hydraulic ram 20 is extendible toward bar 32 and the distal end thereof is securely attached thereto at mount 56. Housing 22 is securely mounted centrally upon panel 46 and extends at a perpendicular from panel 46 in the direction of tail gate 7. Housing 22 is coaxial with rod 58. Due to this arrangement, the hydraulic ram 20 may be fully retracted into housing 22 when ejection panel assembly 6 is moved fully into its retracted position immediately adjacent front end 18 of storage compartment 5. Panel 46 includes an aperture 44 which is sized and positioned such that it will be in registry with opening 48 in front end 18 when ejection panel assembly 6 is retracted and disposed adjacent front end 18.

Figure 8:
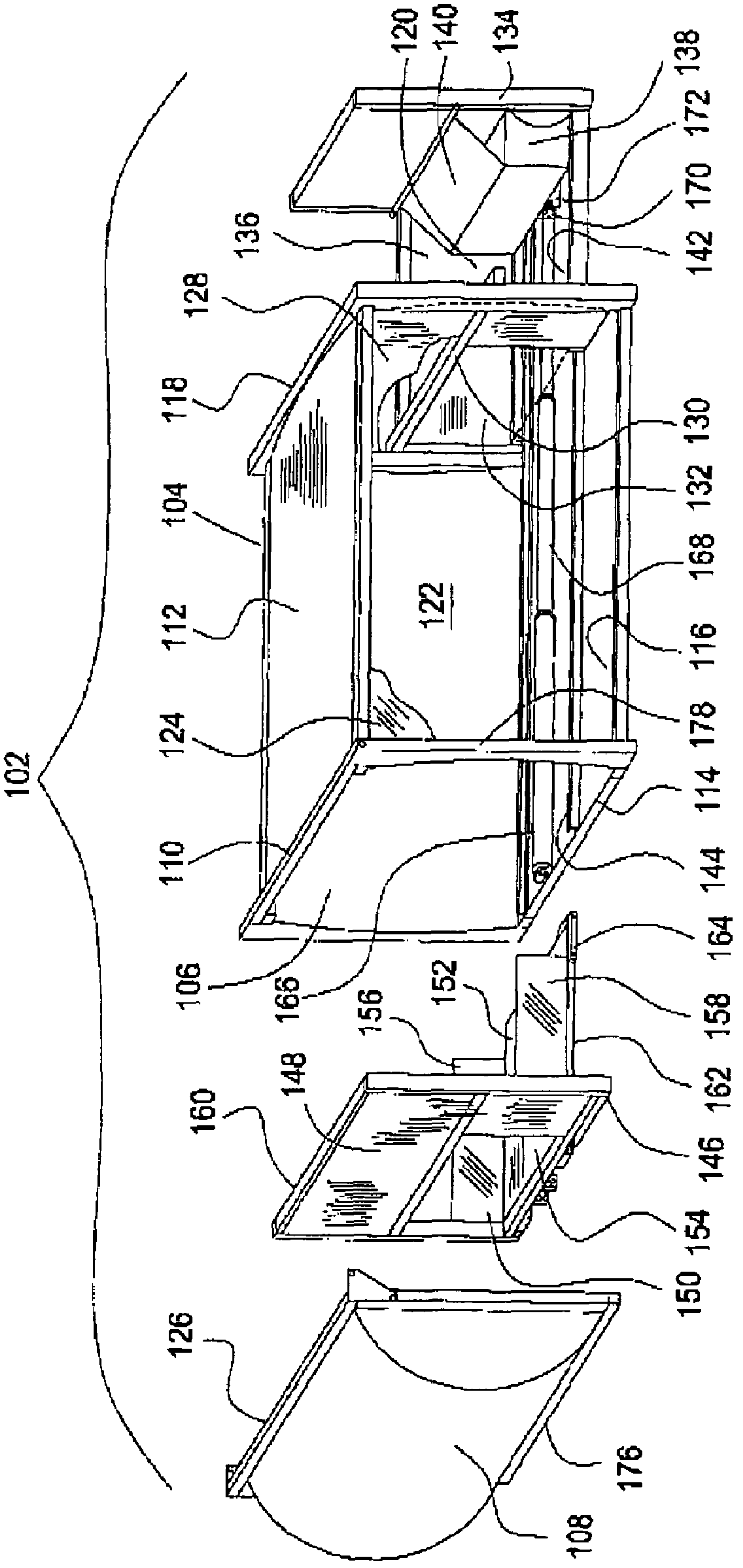
FIG. 8 is a front perspective partly exploded view of an alternate preferred embodiment refuse or recyclables collection body shown with the front walls of the storage compartment and compaction chamber cut away and the loader trough omitted.
Figure 9:
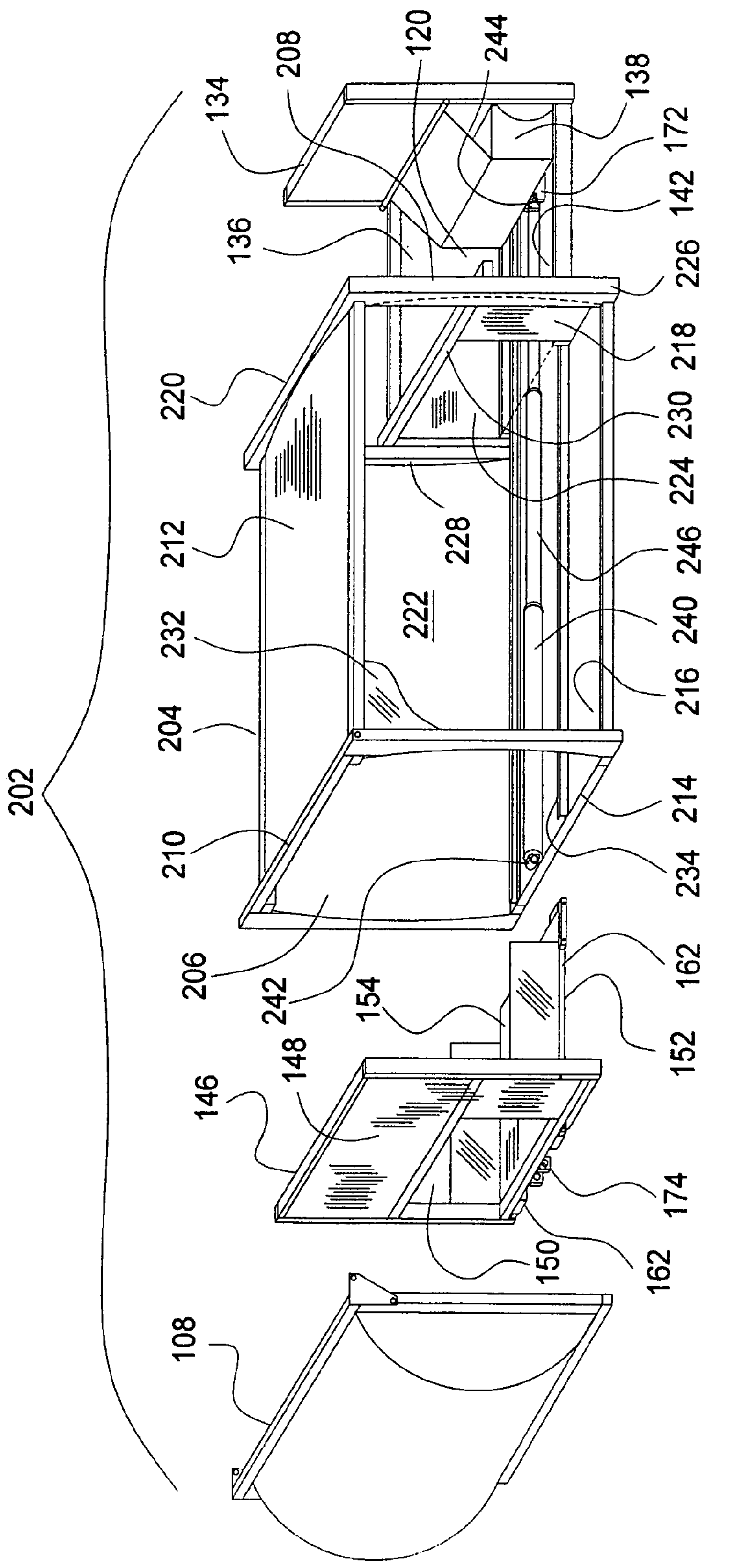
FIG. 9 is a front perspective view, partly exploded, of another alternate preferred embodiment refuse or recyclables collection body shown with the front walls of the storage compartment and compaction chamber cut away and the loader trough omitted.
Figure 10:
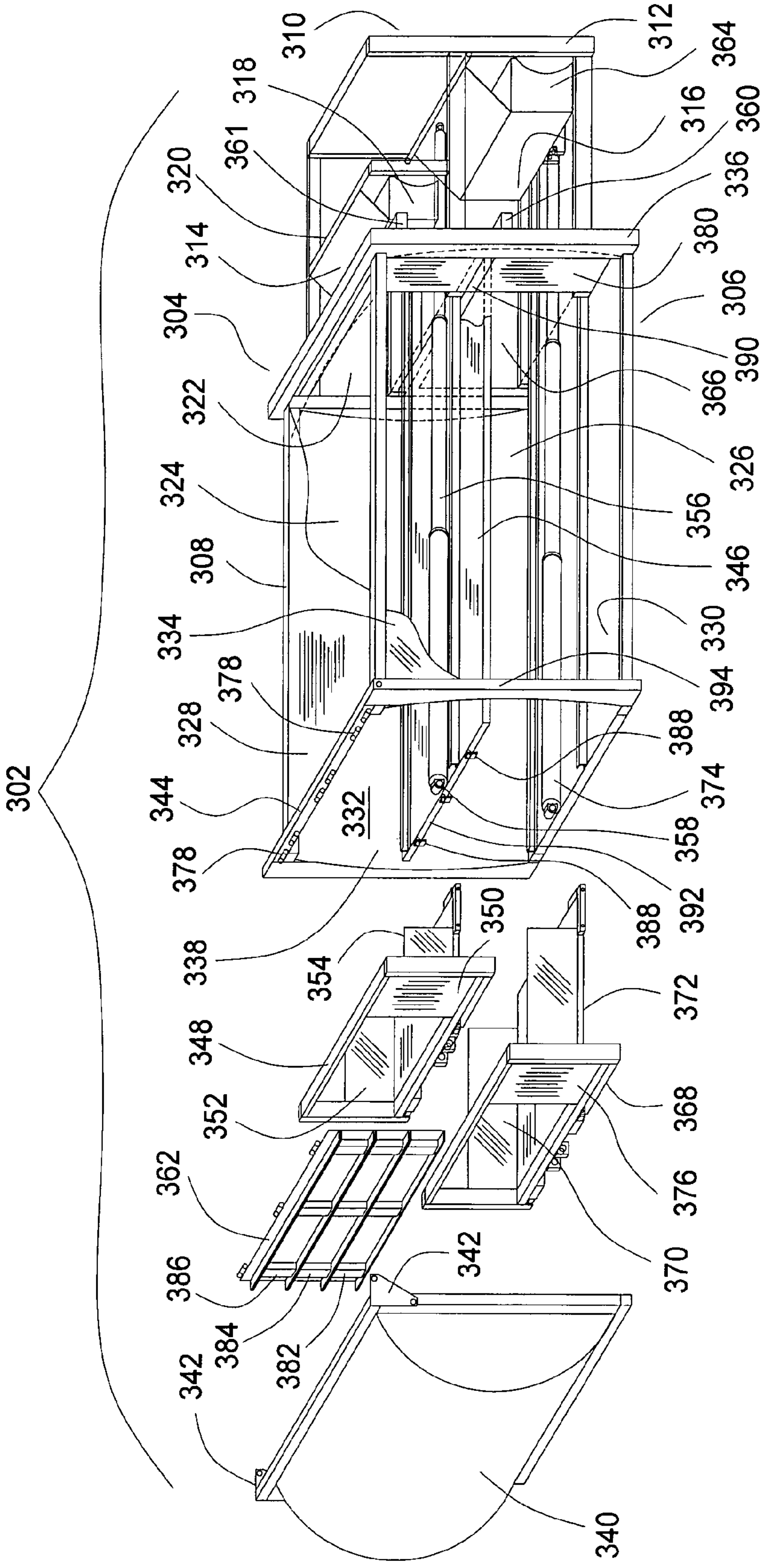
FIG. 10 is a front perspective view, partly exploded, of a preferred embodiment multiple compartment refuse or recyclables collection body illustrated with the front walls of the collection body partly cut away and the loader trough omitted.

Throughout the description of FIGS. 8, 9 and 10, various terms are used such as "top", "bottom", "front", "rear", "left", "right", and the like. These terms are not limitations of orientation of the present invention but these terms are provided for clarity in describing the relationship between members and compartments of the refuse collection body and as applicable, are used in describing relationships between elements when viewed from the rear end of the refuse collection body.

FIG. 8 discloses an alternate preferred embodiment collection body 102 for a refuse collection vehicle. Storage body 102 includes a storage compartment 104 having an open rear end 106 which is selectively enclosed by a curved tailgate 108 which is hinged at its top 126 about the rear edge 110 of roof 112 of storage compartment 104. Bottom 176 of tailgate 108 may be abutted to rear edge 114 of floor 116 of storage compartment 104 and selectively retained to the sides of rear end frame 178 by conventional retaining structures.

Storage compartment 104 comprises a front end 118 opposing rear end 106. Compaction chamber 120 is located immediately adjacent front end 118. Storage compartment 104 further comprises opposing sidewalls 122, 124 which may be planar or outwardly bowed. In FIG. 8, the right sidewall 124 (as viewed from rear end 106) is cut away to allow visual examination of the internal structure of storage compartment 104. Storage compartment 104 includes a front wall 128 at its front end 118. Breaker bar 130 extends across front wall 128 and partly defines opening 132 in front wall 128. Opening 132 allows communication between the interior of storage compartment 104 and compaction chamber 120. Compaction chamber 120 comprises a front bulkhead 134 and opposing sidewalls (left sidewall 136 is shown while the opposing right sidewall has been omitted for clarity.) Compaction chamber 120 is preferably narrower than storage compartment 104 and is offset such that compaction blade 138 may penetrate opening 132 when it is moved away from front bulkhead 134 such that commodity such as garbage, lawn waste, rubbish, trash or recyclable goods, whether sorted or commingled, may be compacted and pushed through opening 132 into storage compartment 104. Wiper cover 140 overlies compaction blade 138 and serves to direct commodity dropped into compaction chamber 120 to the floor 142 of compaction chamber 120 and shields the drive members which move compaction blade 138 away from front bulkhead 134.

Storage compartment 104 further comprises a rail 144 mounted along floor 116. Rail 144 extends longitudinally from rear edge 114 through opening 132 of front wall 128 and below floor 142 of compaction chamber 120. Rail 144 serves to guide and stabilize ejector assembly 146 as it moves through storage compartment 104.

Ejector assembly 146 comprises an upright panel 148 having an aperture 150 therethrough. Aperture 150 is sized and disposed on panel 148 such that it will be in registry with opening 132 when ejector assembly 146 is moved to its fully retracted position adjacent front end 118 of storage compartment 104. Ejector assembly 146 further includes a tray assembly 152 which comprises bottom wall 154 and opposing spaced apart sidewalls 156, 158. Tray assembly 152 is mounted to panel 148 on first surface 160 thereof and is aligned with aperture 150 such that tray assembly 152 may extend into compaction chamber 120 when ejector assembly 146 is retracted to front wall 128. Compaction blade 138 may move into tray assembly 152 when panel 148 is moved to its retracted position adjacent front wall 128. As compaction blade 138 is moved from front bulkhead 134 toward rear end 106, commodity is urged over bottom wall 154 of tray 152 and into storage compartment 104.

Ejector assembly 146 further comprises guides 162 which extend from panel 148 below tray assembly 152 and touchingly engage opposing sides of rail 144. Wear pads 164 are located upon guides 162 to slide along rail 144.

Movement of ejector assembly 146 may be effectuated by hydraulic, mechanical, pneumatic or electrostatic means but in the preferred embodiment, a hydraulic cylinder 166 with associated telescoping piston rod 168 is fixed to panel 148 with distal end 170 of piston rod 168 fixed to front bulkhead 134 by mounting bracket 172 such that as piston rod 168 extends, ejector assembly 146 will be driven toward rear end 106 and as piston rod 168 is retracted, ejector assembly 146 will be drawn toward front wall 118 with tray assembly 152 extending into compaction chamber 120. Distal end 170 of piston rod 168 may alternately be mounted to a sidewall of storage compartment 104, or to roof 112 or to floor 116 thereof, with hydraulic cylinder 166 mounted at desirable locations on ejection assembly 146 such that extension of piston rod 168 will move ejector assembly 146 as desired.

It is to be understood that as compaction chamber 120 receives commodity, compaction blade 138 may be selectively operated to compact commodity and push it over bottom wall 154 of tray assembly 152 into storage compartment 104 through opening 132 and aperture 150.

The movement of compaction blade 138 is accomplished by a drive means such as a hydraulic ram which is separate from and independent of hydraulic cylinder 166 and piston rod 168 which drives ejector assembly 146.

Once storage compartment 104 has been filled with compacted commodity and is ready for emptying, tailgate 108 may be released from its attachment to rear end frame 178 and rotated away from rear end 106. Ejector assembly 146 may then be moved toward rear end 106 pushing commodity out of storage compartment 104. If commodity falls back through aperture 150 as ejector assembly 146 moves toward rear end 106, such commodity will be contained in tray assembly 152 and ejector assembly 146 may be returned to its position adjacent front wall 128 and compaction blade 138 may be activated to push commodity in tray assembly 152 into storage compartment 104 rearward of panel 148. Then ejector assembly 146 may again be moved toward rear end 106 to cause remaining commodity to be pushed out rear end 106 of storage compartment 104.

FIG. 9 discloses another preferred embodiment of a storage body 202 for a refuse or recyclables collection truck. Many elements of the storage body 202 of FIG. 9 are identical to elements of the storage body 102 of FIG. 8 and such elements are identified by the same numerals in both figures.

The storage body 202 of FIG. 9 comprises a hollow storage compartment 204 which includes a generally rectangular forward end frame 220 which defines the open front end 208 of storage compartment 204. Compaction chamber 120 is mounted immediately adjacent front end 208 with left sidewall 122 and the opposing sidewall abutted to forward end frame 220. Forward end frame 220 includes a breaker bar 230 which is fixed at its ends to side beams 226 and 228 of forward end frame 220 and is disposed generally horizontally. Breaker bar 230 defines the upper boundary of entry opening 224 through which commodity such as refuse or recyclables which have been compacted may be moved from compaction chamber 120 into storage compartment 204.

Because compaction chamber 120 is preferably narrower than storage compartment 204, a front cover plate 218 is disposed below breaker bar 230 between entry opening 224 and first side beam 226 of forward end frame 220. Front cover plate 218 extends to floor 216 of storage compartment 204 and is disposed in the plane of forward end frame 220.

Storage compartment 204 further comprises a roof 212 and sidewalls, including left sidewall 222. The right sidewall 232 of storage compartment 204 has been cut away to enable illustration of internal structure of storage compartment 204.

It may be seen that rear end opening 206 will be enclosed by tail gate 108 when tail gate 108 is lowered such that its lower edge 176 may be abutted to rear edge 214 of floor 216 of storage compartment 204 and tailgate 108 may be locked to rear end frame 178. Storage compartment 204 is enclosed at its top by roof 212 which may be planar or arched as shown in FIG. 9.

A hydraulic ram 240 is disposed along floor 216 and is provided to move ejector panel 146 longitudinally through storage compartment 204. Hydraulic ram 240 comprises a cylinder end 242 coupled to connecting bracket 174 of ejector panel and a distal rod end 244 attached to mounting bracket 172 below compaction blade 138 within compaction chamber 120. Hydraulic ram 240 therefore can be retracted to bring panel 148 of ejector assembly 146 adjacent to forward end frame 220 so panel 148 serves as a front closure for storage compartment 204. With tailgate 108 pivoted about top beam 210 of rear end opening 206 to its open position, hydraulic ram 240 may be extended to move panel 148 from forward end frame 220 through storage compartment 204 to rear end opening 206, thereby sweeping commodity from the interior of storage compartment 204 and out rear end opening 206.

Hydraulic ram 240 may be alternatively connected at its rod end 244 to breaker bar 230 or to either sidewall 232, or to roof 212 of storage compartment 204. In addition, cylinder end 242 of hydraulic ram 240 may be attached at various locations on ejector assembly 146. Because hydraulic ram 240 preferably includes a telescoping rod 246, ejector assembly 146 may be moved throughout the length of storage compartment 204 while the hydraulic ram which drives compaction blade 138 need extend far less though it will be cycled more often as the collection body 202 is filled.

Ejector panel 146 is guided along rail 234 mounted along floor 216. Rail 234 extends into compaction chamber 120 such that guide 162 may follow rail 234, extending into compaction chamber 120 below raised floor 142 thereof.

Compaction blade 138 is driven independently from hydraulic ram 240 and is operable to move from a retracted position adjacent front bulkhead 134 through compaction chamber 120 and over bottom wall 154 of tray assembly 152 such that commodity in compaction chamber 120 is compressed and urged into storage compartment 204 through entry opening 224 and aperture 150 of panel 148. Preferably compaction blade 138 and tray assembly 152 are sized to allow compaction blade 138 to sweep over bottom wall 154 of tray assembly 152 to move compressed commodity from compaction chamber 120 into storage compartment 204. Compaction blade 138 may also move past panel 148 a short distance (approximately six to twenty-four inches) in order to urge compressed commodity well past panel 148 into storage compartment 204. While storage compartment 204 is being filled, ejector assembly 146 remains positioned at forward end frame 220 and panel 148 serves as a closure for the forward end 208 of storage compartment 204.

As commodity is forced through entry opening 224 and thereby through aperture 150, compressed commodity is urged along floor 216 until it engages tail gate 108 which, due to its concave shape, vectors compressed commodity upward and back toward the forward end 208 which is enclosed by panel 148.

Compactor blade 138 is preferably shorter in height than entry opening 224 and may be extended past panel 146 when panel 146 is stationed adjacent forward end frame 220. It has been found that a gap between the top of compaction blade 138 and breaker bar 230 results in improved compaction and exit of commodity from compaction chamber 120 through aperture 150 of panel 148.

When storage compartment 204 has been filled, the truck on which storage body 202 is installed may be moved to an off-loading site where tailgate 108 may be released and rotated about top beam 210 of rear end opening 206. Then ejector assembly 146 may be moved rearward toward open rear end 206 causing ejectment of commodity from storage compartment 204. Because commodity stored in storage compartment 204 has been greatly compacted by the extreme compression force of compactor blade 138, the compacted commodity will perform in a unitary fashion as a compacted mass. Because the compacted mass will move substantially as a unit and because aperture 150 is substantially smaller in area than panel 148, little commodity will fall through aperture 150 when panel 148 of ejector assembly 146 urges the commodity toward open rear end 206. If commodity falls through aperture 150 as panel 148 is moved toward rear end opening 206, it will fall onto tray 152 between sidewalls 156, 158 thereof. Ejector assembly 146 may then be retracted to forward end frame 220 such that tray assembly 152 extends into compaction chamber 120. Compactor blade 138 may then be activated to push commodity on tray assembly 152 into storage compartment 204 between panel 148 and open rear end 206. Ejector assembly 146 can then be driven by hydraulic ram 240 to urge the remaining commodity out of open rear end 206 of storage compartment 204. Tipping of storage body 202 is unnecessary to empty storage compartment 204 due to provision of ejector assembly 146. When storage compartment 204 has been emptied, ejector assembly 146 is moved back to its retracted position with panel 148 adjacent forward end frame 220 and tailgate 108 may be closed and locked.

FIG. 10 discloses on exploded view of a third alternative preferred embodiment multicompartment refuse and recyclables collection body 302. Multicompartment collection body 302 comprises at least two separate commodity collection assemblies 304, 306. Such a multicompartment collection body may be of the type described in U.S. Pat. No. 5,599,071, the disclosure of which is incorporated herein in its entity, or it may be multicompartmented laterally, that is, compartments 304, 306 may be side-by-side rather than over and under. In addition, multicompartment collection body 302 may house more than two collection assemblies, either laterally arranged or with one or more collection assemblies disposed above one or more additional collection assemblies.

First collection assembly 304 and second collection assembly 306 disposed below first collection assembly 304 are housed within body frame 308 and compactor housing 310. Compactor housing 310 comprises front bulkhead 312 and houses first compaction chamber 314 overlying second compaction chamber 316. First compaction chamber 314 comprises first compaction blade 318 which is driven by a drive mechanism which may be a hydraulic ram which is operable independent of operation of other driving mechanisms within multicompartment collection body 302. First compaction blade 318 is illustrated in its retracted position adjacent intermediate bulkhead 320 which is spaced apart from front bulkhead 312 such that commodity may be dropped into second compaction chamber 316 between front bulkhead 312 and intermediate bulkhead 320. First compaction blade 318 may be selectively moved to a fully extended position extending through first opening 322 a limited distance of approximately twelve to twenty-four inches. First opening 322 is disposed beneath first breaker bar 361 and serves as an entry into first storage subcompartment 324 which overlies second storage subcompartment 326 though the plural compartments 304, 306 may be arranged in a side-by-side fashion in which event, first storage subcompartment 324 would be laterally adjacent second storage subcompartment 326. First storage subcompartment 324 and second storage subcompartment 326 are jointly housed in body-frame 308 which comprises roof 328, bottom wall 330, and opposing sidewalls 332, 334. Roof 328 and sidewalls 332, 334 may be planar or bowed slightly outward. Body frame 308 is immediately adjacent compactor housing 310 and preferably is mounted thereto. Body frame 308 comprises a front end frame 336 and opposing open rear end 338 which may be selectively enclosed by tailgate 340 which is hinged at hinge bracket 342 to body frame 308 such that tailgate 340 may be selectively rotated about rear top beam 344 of body frame 308. A second breaker bar 360 extends laterally across front end frame 336 generally at the height of forward end 390 of divider 346. Front end frame 336 comprises a front wall panel 380 which overlies the area of front end frame 336 not longitudinally aligned with compactor housing 310.

Body frame 308 further comprises divider 346 which separates first storage subcompartment 324 from second storage subcompartment 326. A top hinged rear bulkhead 362 is provided at rear end 338 in registry with first storage subcompartment 324. Rear bulkhead 362 may be selectively locked in a generally vertical orientation to divider 346. When first storage subcompartment 324 is to be emptied, rear bulkhead 362 is disconnected from divider 346 and swung rearward rotating about hinges 378 on rear top beam 344 of rear end 338. When released from divider 346, rear bulkhead 362 may be selectively attached to tailgate 340 so that when desired, rear bulkhead 362 will move with tailgate 340.

In the multicompartment collection body 302 of FIG. 10, divider 346 is hinged at the forward end 390 thereof to second breaker bar 360 such that divider 346 may be inclined toward rear end 338 or maintained generally horizontally as shown in FIG. 10. Mountings 388 are provided on rear edge 392 which may be selectively attached to rear bulkhead 362. Rear bulkhead 362 may selectively comprise one or more panels 382, 384, 386 depending on the relative volumes desired within first storage subcompartment 324 and second storage subcompartment 326. With all three of panels 382, 384, and 386 in place on rear bulkhead 362, divider 346 may be mounted at its rear edge 392 by mountings 388 to the bottom of lowest panel 382. If it is desired that the volume of second storage subcompartment 326 be increased, then first storage subcompartment 324 must be reduced, this is accomplished by removing one or both of lower panels 382, 384 and raising the rear edge 392 of divider 346 and securing it to the bottom of the lower of panels 384, 386 which remains in place on rear bulkhead 362. Therefore rear bulkhead 362 serves to maintain the incline, if any, of divider 346. If panels 382 and 384 remain part of rear bulkhead 362, mounting rear edge 392 to the edge of bottom panel 382 will position divider 346 generally at a horizontal. Divider 346 may be detached from the lowermost of panels 382, 384, 386 which are in place and rear bulkhead 362 may be latched to tailgate 340 such that rear bulkhead 362 will be rotated away from rear end 338 around hinges 378 as tailgate 340 is opened. Once released, divider 346 comes to rest at a generally horizontal orientation and first ejection panel assembly 348 can then be operated to sweep commodity from first storage subcompartment 324. Because divider 346 may be inclined from horizontally, first hydraulic ram 356 is necessarily hinged at its attachment to front bulkhead 312.

First ejection panel assembly 348 is operable within first storage subcompartment 324 from a retracted storage position adjacent front end frame 336 to an ejectment position at rear end 338 of body frame 308, thereby serving to sweep commodity from first storage subcompartment 324 when tailgate 340 is released and raised and rear bulkhead 362 in swung rearward, thereby fully uncovering rear end 338. First ejection panel assembly 348 comprises an upright panel 350 which generally corresponds to the vertical area of first storage subcompartment 324 at front end frame 336. Panel 350 comprises an aperture 352 therethrough. When first ejection panel assembly 348 is in its storage position, aperture 352 is in registry with first opening 322 and with first compaction blade 318 and when first ejection panel assembly 348 is so positioned, first compaction blade 318 may move within tray 354 which is carried on panel 350 facing first compaction chamber 314.

First ejection panel assembly 348 may be moved through first storage subcompartment 324 by operation of telescoping first hydraulic ram 356 which is connected at its cylinder end 358 to first ejection panel assembly 348 and hinged at its rod end to front bulkhead 312 or to another structural component located at or forward of front end frame 336, including for instance, second breaker bar 360.

The tray 354 of first ejection panel assembly 348 will extend forward of front end frame 336 and into first compaction chamber 314 when first ejection panel assembly 348 is retracted to its storage position.

Referring still to FIG. 10, second collection assembly 306 comprises second storage subcompartment 326 contained in body frame 308 and joined at front end frame 336 to second compaction chamber 316. Commodity present in second compaction chamber 316 may be compressed by second compaction blade 364 which is moveable through second compaction chamber 316 from its retracted position at front bulkhead 312 to an extended position extending through second opening 366 a short distance into second storage subcompartment 326. Because second ejection panel assembly 368 will be stationed at its retracted position adjacent front end frame 336 when second compaction blade 364 penetrates second opening 366, second compaction blade 364 will also pass through aperture 370 of second ejection panel assembly 368. Because of the inclusion of tray 372 on second ejection panel assembly 368, second compaction blade 364 will sweep commodity over tray 372 as it extends to urge commodity in second compaction chamber 316 into second storage subcompartment 326. Second ejection panel assembly 368 may be selectively moved from a fully retracted position adjacent front end frame 336 through second storage subcompartment 326 to open rear end 338. As second ejection panel assembly 368 is moved from its retracted position to its fully extended position, second ejection panel assembly 368 sweeps commodity present in second storage subcompartment 326 out open rear end 338.

Second ejection panel assembly 368 is operable independently of first ejection panel assembly 348 as well as independently of first compaction blade 318 and second compaction blade 364. Second hydraulic ram 374 is disposed within second storage subcompartment 326, preferably along floor 330 and interconnects second ejection panel assembly 368 with front bulkhead 312 such that as second hydraulic ram 374 extends telescopically, second ejection panel assembly 368 is moved toward open rear end 338.

In operation, the multicompartment collection body 302 is mounted to a truck chassis and is used to collect commodity of more than one kind and compresses and stores each kind of commodity separately. A first kind of commodity may be placed in first compaction chamber 314 by use of a front loading apparatus such as is illustrated in U.S. Pat. No. 5,599,071 or with a side loading trough or tipper assembly as illustrated in FIGS. 1 and 2. Once a first kind of commodity is placed in first compaction chamber 314, first compaction blade 318 may be selectively operated to crush and compress the commodity and urge it over tray 354 of first ejection panel assembly 348 and through aperture 352 thereof as well as through first opening 322 and into first storage subcompartment 324 where it is packed against rear bulkhead 362 as more commodity is forced into first storage subcompartment 324.

As a second kind of commodity is collected, it is placed into second compaction chamber 316 where it may be compressed and shoved into second storage subcompartment 326 by selective operation of second compaction blade 364 which moves over tray 372 of second ejection panel assembly 368 which will be in its retracted position while commodity is being collected. In moving the second kind of commodity into second storage subcompartment 326, second compaction blade 364 of necessity passes through aperture 370 of second ejection panel assembly 368 and below second breaker bar 360 and through second opening 366. Second compaction blade 364 also may be extended a short distance (six to twenty-four inches) rearward of the plane of panel 376 of second ejection panel assembly 368.

As commodity continues to be urged into second storage subcompartment 326, it is urged against the concave inner surface of tailgate 340 which urges the compacted commodity upward and forward toward the rear bulkhead 362 which prevents commodity of the kind stored in second storage subcompartment 326 from commingling with the first kind of commodity which has been stored in first storage subcompartment 324 forward of rear bulkhead 362.

When multicompartment collection body 302 is ready for emptying, the truck on which it is mounted may be moved to a first discharge location for the commodity of the kind stored in second storage subcompartment 326. At that location, tailgate 340 is released and rotated about rear top beam 344 to an open position. Second ejection panel assembly 368 can then be activated to sweep through second storage subcompartment 326 forcing commodity therein out the open rear end 338. Due to substantial compaction of commodity, especially refuse, by the compaction blade as it pushes commodity past the respective ejection panel into the respective storage compartment, the stored commodity tends to become a rigid mass and little will fall back through the aperture of the ejection panel. If commodity falls through aperture 370, it is captured on tray 372. Second ejection panel assembly 368 can be returned to its retracted position at front end frame 336 and second compaction blade 364 can be employed to push commodity on tray 372 through aperture 370 onto floor 330 after which second ejection panel assembly 368 can be swept over floor 330 and through second storage subcompartment 326 to eject the remaining commodity.

After emptying of second storage subcompartment 326, second ejection panel assembly 368 is returned to its retracted position and tailgate 340 is closed and the collection truck can be moved to a location for discharge of the kind of commodity stored in first storage subcompartment 324. At such location, rear bulkhead 362 is released from divider 346 and latched to tailgate 340 which is again opened, rotating rear bulkhead 362 as it is opened, thereby exposing open rear end 338. Because rear bulkhead 362 is released from its mooring to divider 346, divider 346 may lower preferably to a generally horizontal position generally parallel to floor 330. Rear bulkhead 362 is held out of the way by tailgate 340 while first ejection panel assembly 348 sweeps commodity in first storage subcompartment 324 therefrom, ejecting it from open rear end 338.

If commodity within first storage subcompartment 324 falls through aperture 352 of first ejection panel assembly 348 as it is moved rearward, such commodity will fall into tray 354 of first ejection panel assembly 348. First ejection panel assembly 348 may then be retracted to front end frame 336 and first compaction blade 318 extended over tray 354 and through aperture 352 to force the remaining commodity rearward of first ejection panel assembly 348 onto divider 346 where it can be swept out open rear end 338 by movement of first ejection panel assembly 348 toward rear end 338.

Once first storage subcompartment 324 is empty, divider 346 is raised appropriately to latch to rear bulkhead 362 when rear bulkhead 362 is returned to its generally vertical position as tailgate 340 is closed. Rear bulkhead 362 is then detached from tailgate 340 and attached to divider 346. The tailgate 340 may be locked to the sides of rear end frame 394 and the collection vehicle is ready to return to collection of commodities.

Although the present invention has been described with reference to preferred embodiments, workers skilled in the art will recognize that changes may be made in form and detail without departing from the spirit and scope of the invention.

Having described the invention, we claim:

1. In a body for refuse or recyclables, the body having a compaction chamber, a compaction blade, a storage compartment, and a tailgate selectively enclosing a rear opening of the storage compartment, the improvement comprising an ejector panel disposed within the storage compartment, the ejector panel comprising an aperture therethrough, the ejector panel selectively movable from a retracted position to any position throughout the storage compartment to a rear position at the rear opening of the storage compartment, the compaction blade selectively moveable from a retracted position to an extended position extending through the aperture of the ejector panel, when the ejector panel is in its retracted position, the extended position of the compaction blade disposed a limited distance into the storage compartment, the storage compartment has a stationary front wall, the retracted position of the ejector panel being adjacent the stationary front wail, the front wall having an opening therethrough in registry with the aperture in the ejector panel, the compaction blade selectively moveable through the opening in the front wall and through the aperture in the ejector panel, whereby the compaction blade may urge refuse or recyclables within the compaction chamber through the aperture of the panel into the storage compartment.

2. The improvement of claim 1 wherein the ejector panel is moved by a first hydraulic ram, the compaction blade moveable by a driving member other than the first hydraulic ram.

3. The improvement of claim 1 wherein the ejector panel is moved by a first driving member, the compaction blade moveable by a second driving member.

4. The improvement of claim 1 wherein the storage compartment comprises at least two independent storage compartment units, the ejector panel moveable within a one of the at least two independent storage compartment units.

5. The improvement of claim 1 wherein the ejector panel comprises a front side and a rear side, a tray member extending from the front side of the ejector panel, the tray member receivable within the compaction chamber, the compaction blade receivable within the tray member.

6. The improvement of claim 5 wherein the tray member comprises sidewalls and a floor interconnecting the sidewalls, the sidewalls extending above the floor less than the height of the aperture of the ejector panel.

7. The improvement of claim 1 wherein the ejector panel further comprises a guide and stabilizing means to provide the ejector panel structural stability as it moves within the storage compartment from the retracted position to the rear position.

8. A collection body for refuse or recyclables comprising a storage compartment having a front end and an opposing open rear end, the open rear end selectively covered by a tailgate, a compaction compartment comprising a compaction blade therein and comprising a front end and an opposing rear end, the rear end adjacent the front end of the storage compartment, the compaction blade moveable from a first position at the front end of the compaction compartment to a second position, an ejector assembly selectively moveable within the storage compartment from a first position adjacent the front end of the storage compartment to a second position at the rear end of the storage compartment, the ejector assembly comprising an upright panel having an aperture therethrough through which the compaction blade may move, the aperture substantially smaller than the upright panel, the storage compartment has a front end wall at the front end thereof, the front end wall having an opening therein, the opening of the front end wall in substantial registry with the aperture of the upright panel, the compaction blade receivable within the opening of the front end wall when the compaction blade is in its second position.

9. The collection body of claim 8 wherein the ejector assembly is moved within the storage compartment by a hydraulic ram, the hydraulic ram interconnecting the ejector panel and a stationary part of the collection body.

10. The collection body of claim 9 wherein the hydraulic ram is mounted to the ejector assembly, the hydraulic ram comprising an extendible rod, the rod fixed at a distal end thereof to a part of the compaction body, whereby the ejector assembly may be moved toward the open rear end by extension of the rod of the hydraulic ram.

11. The collection body of claim 8 wherein the upright panel comprising a front side and a rear side, a tray member extending from the front side of the ejector panel, the tray member receivable within the compaction chamber, the compaction blade receivable within the tray member.

12. A collection body for refuse and recyclables comprising a storage body having an open rear end and an opposing front end, the open rear end selectively covered by a tailgate, the storage body including at least two storage subcompartments, each subcompartment having a front end and an open rear end, a compaction chamber adjacent a front end of each subcompartment, each compaction chamber comprising a compaction blade selectively moveable therethrough from a retracted position to an extended position, the compaction blade of a first of the compaction chambers extendible at least to the front end of the subcompartment adjacent the first of the compaction chambers, the compaction blade of a second of the compaction chambers extendible at least to the front end of the subcompartment adjacent the second of the compaction chambers, the subcompartment adjacent the first of the compaction chambers comprising an ejector assembly selectively moveable from a first position adjacent a front end of the subcompartment to a second position spaced apart from the first position, the ejector assembly comprising an upright panel having an aperture therethrough, the aperture of the panel of the ejector assembly in registry with the compaction blade of the first of the compaction chambers, at least one storage subcompartment has a front wall at the front end of thereof, the front wall having an opening therein, the opening of the front wall in the substantial registry with the aperture of the upright panel of the at least one subcompartment, the compaction blade of the compaction chamber adjacent the front end of the at least one subcompartment receivable within the opening of the front wall when the compaction blade is in its second position.

13. A collection body for refuse and recyclables comprising a storage body having an open rear end and a front end, the open rear end selectively covered by a tailgate, the storage body including a first storage subcompartment and a second storage subcompartment, the subcompartments separated by a divider, a compaction body adjacent the front end of the storage body, the compaction body comprising a first compaction chamber and a second compaction chamber, the first compaction chamber adjacent the first subcompartment, the second compaction chamber adjacent the second subcompartment, each of the compaction chambers comprising a compaction blade moveable therethrough from a retracted position to an extended position, the extended position of the compaction blade of the first compaction chamber within the first subcompartment, the extended position of the compaction blade of the second compaction chamber within the second subcompartment, each subcompartment comprising an ejector assembly selectively moveable from a first position adjacent a front end of the subcompartment to a second position spaced apart from the first position, each of the ejector assemblies comprising an upright panel having an aperture therethrough, the aperture of the panel of the ejector assembly of the first subcompartment in registry with the compaction blade of the first compaction chamber, the aperture of the panel of the ejector assembly of the second subcompartment in registry with the compaction blade of the second compaction chamber, at least one of the first and second storage subcompartments has a front wall at the front end of the storage body, the front wall having an opening therein, the opening of the front wall in the substantial registry with the aperture of the upright panel of the at least one of the first and second subcompartments, the compaction blade of the compaction chamber adjacent the at least one of the first and the second storage compartments receivable within the opening of the front wall when the compaction blade is in its second position.

14. The collection body for refuse and recyclables of claim 13 wherein a rear bulkhead is disposed in at least a first of the subcompartments, the rear bulkhead selectively fixed in an upright orientation, the rear bulkhead spaced apart from the front end of the at least a first of the subcompartments.

15. The collection body for refuse and recyclables of claim 14 wherein the rear bulkhead is hinged to a wall of the at least a first of the subcompartments, the rear bulkhead selectively mounted at a free edge thereof to the divider, whereby the bulkhead may be selectively rotated toward the rear end of the storage compartment.

16. The collection body for refuse and recyclables of claim 13 wherein the panel of the ejector assembly of the first subcompartment comprises a tray extending toward the front end of the storage compartment, the tray disposed below the aperture of the panel, the compaction blade of the first compaction chamber moveable over the tray when the ejector assembly is in its first position.

17. The collection body for refuse and recyclables of claim 16 wherein the panel of the ejector assembly of the second subcompartment comprises a tray disposed below the aperture of the panel, the tray extending toward the front end of the storage compartment, the compaction blade of the second compaction chamber moveable over the tray of the panel of the ejector assembly of the second subcompartment when the ejector assembly of the second subcompartment is in its first position.

18. A commodity collection body comprising a storage compartment having a front end and an opposing open rear end, a tailgate selectively enclosing the open rear end, the storage compartment comprises a front end wall at the front end thereof, a compaction body mounted at the front end of the storage compartment and having a compaction blade therein, the compaction blade moveable from a first position to a second position to compact commodity in the compaction body, the front end of the storage compartment having an opening therein, the compaction blade extending through the opening when the compaction blade is in its second position, an ejector assembly selectively moveable within the storage compartment from a first position adjacent the front end of the storage compartment to a second position substantially spaced apart from the first position, the ejector assembly comprising an upright panel, the panel having an aperture therethrough in registry with the compaction blade, the compaction blade urging commodity into the storage compartment through the opening in the front end and through the aperture of the panel, an opening in the front wall in registry with the aperture of the panel of the ejector assembly.

19. The commodity collection body of claim 18 wherein the ejector assembly comprises a tray member extending toward the front end of the storage compartment, the tray member disposed below the aperture of the upright panel, whereby commodity passing through the aperture toward the compaction body is collected on the tray member.

20. The commodity collection body of claim 18 wherein the ejector assembly further comprises a hydraulic ram mounted to the upright panel, the hydraulic ram having an extendible rod, the rod fixed at a distal end thereof to the front end of the storage compartment, whereby the upright panel may be moved toward the open rear end by extension of the rod of the hydraulic ram.

21. The commodity collection body of claim 18 wherein the ejector assembly further comprises at least one leg extending toward the compaction chamber.

22. The commodity collection body of claim 18 wherein guide means is provided in the storage compartment to engage the ejector assembly as it moves from its first position to its second position.

23. The commodity collection body of claim 18 wherein the ejector assembly further comprises a pair of spaced apart parallel legs extending at a perpendicular from the panel of the ejector assembly.

24. The commodity collection body of claim 23 wherein each of the legs includes at least one wear pad thereon, the at least one wear pad of one of the legs opposes the at least one wear pad on the other of the legs, a rail is mounted longitudinally within the storage compartment, the wear pads engage the rail.

25. In a body for refuse or recyclables, the body having a compaction chamber, a compaction blade, a storage compartment, and a tailgate selectively enclosing a rear opening of the storage compartment, the improvement comprising an ejector panel disposed within the storage compartment, the ejector panel comprising an aperture therethrough, the aperture substantially smaller than the panel, the ejector panel selectively movable from a retracted position to any position throughout the storage compartment to a rear position at the rear opening of the storage compartment, the compaction blade selectively moveable from a retracted position to an extended position extending through the aperture of the ejector panel when the ejector panel is in its retracted position, the extended position of the compaction blade disposed a limited distance into the storage compartment, the storage compartment comprises a front end wall at a front end thereof, an opening in the front end wall in registry with the aperture of the panel of the ejector assembly.

26. The collection body of claim 12 wherein the aperture is substantially smaller than the upright panel.

27. The collection body of claim 13 wherein each aperture of each upright panel substantially smaller than the panel.

28. The commodity collection body of claim 18 wherein the aperture is smaller in area than the upright panel.

29. A front loading or side loading commodity collection body comprising a compaction blade operable through a compaction compartment disposed adjacent a front end of a storage compartment, the storage compartment comprising an ejection panel moveable therethrough from the front end thereof to an open rear end thereof, the ejection panel including an aperture therethrough, the aperture substantially smaller than the ejection panel, the compaction blade limited in movement from a retracted position to an extended position within the storage compartment, the extended position of the compaction blade substantially distant from the rear end of the storage compartment, the compaction blade moveable through the aperture of the ejection panel when the ejection panel is adjacent the front end of the storage compartment, the storage compartment comprises a front end wall at a front end thereof, an opening in the front end wall in registry with the aperture of the panel of the ejector assembly.

30. The front loading or side loading commodity collection body of claim 29 wherein the ejection panel further comprises a tray member disposed at a first end thereof, the tray extending into the compaction compartment when the ejection panel is adjacent the front end of the storage compartment.

31. A collection body for refuse of recyclables comprising a storage compartment having a front end and an opposing open rear end, the open rear end selectively covered by a tailgate, a compaction compartment comprising a compaction blade therein and further comprising a front end and an opposing rear end, the rear end of the compaction compartment adjacent the front end of the storage compartment, the compaction blade moveable from a first position at the front end of the compaction compartment to a second position, an ejector assembly selectively moveable within the storage compartment from a retracted position adjacent the front end of the storage compartment to an extended position displaced from the front end of the storage compartment, the ejector assembly comprising an upright panel having an aperture therethrough, the aperture substantially smaller than the upright panel, the aperture in substantial registry with the compaction blade, the storage compartment comprises a front end wall at a front end thereof, an opening in the front end wall in registry with the aperture of the panel of the ejector assembly.

* * * * *

UNITED STATES PATENT AND TRADEMARK OFFICE

CERTIFICATE OF CORRECTION

PATENT NO. : 7,563,066 B2
APPLICATION NO. : 10/982507
DATED : July 21, 2009
INVENTOR(S) : Robert D. Jones et al.

It is certified that error appears in the above-identified patent and that said Letters Patent is hereby corrected as shown below:

Column 13,
Line 59, delete "wail" and substitute therefor --wall--.

Column 18,
Line 56, delete "of" and substitute therefor --or--.

Signed and Sealed this

Seventeenth Day of November, 2009

David J. Kappos
*Director of the United States Patent and Trademark Office*